United States Patent
Wagener et al.

(10) Patent No.: US 6,874,644 B1
(45) Date of Patent: Apr. 5, 2005

(54) METHOD OF AND APPLIANCE FOR MATERIAL SEPARATION

(75) Inventors: Reinhard Wagener, Hofheim (DE); Michael Haubs, Bad Kreuznach (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/936,752

(22) PCT Filed: Mar. 17, 2000

(86) PCT No.: PCT/EP00/02366

§ 371 (c)(1),
(2), (4) Date: Sep. 17, 2001

(87) PCT Pub. No.: WO00/56417

PCT Pub. Date: Sep. 28, 2000

(30) Foreign Application Priority Data

Mar. 19, 1999 (DE) .......................... 199 12 269

(51) Int. Cl.[7] .............................................. B01D 11/04
(52) U.S. Cl. ........................ 210/513; 210/511; 210/772
(58) Field of Search ................................. 210/634, 635, 210/772, 800, 801, 803, 150, 151, 511, 513, 519, 520, 521; 95/210, 211, 213; 96/290, 299; 261/114.1, 114.3

(56) References Cited

U.S. PATENT DOCUMENTS

| | | | |
|---|---|---|---|
| 4,290,998 A | 9/1981 | Dick et al. .................. 422/193 |
| 4,590,038 A | 5/1986 | Schreiber et al. ............ 422/142 |
| 5,106,556 A | * | 4/1992 | Binkley et al. ........... 261/114.1 |
| 5,328,592 A | * | 7/1994 | Hedrick ...................... 208/113 |

OTHER PUBLICATIONS

Derwent Abstract of published Japanese appln. JP53016369 A, ((MITB)Mitsui ENG & Shipbuilding CO), XP–002142096 (Feb. 15, 1978).

* cited by examiner

Primary Examiner—Robert James Popovics
(74) Attorney, Agent, or Firm—Connolly Bove Lodge & Hutz LLP

(57) ABSTRACT

The invention relates to a method of material separation, in which a material, which comprises at least a first material component and a second material component, is introduced, together with a washing fluid, into a container with at least one sedimentation chamber and is subjected to a gravitational field, under influence of the gravitational field in the sedimentation chamber, the first material component is enriched in a sedimentation zone, which is bounded by a base, and the material with the enriched first material component is evacuated from the sedimentation zone via an opening in the base, the material with the enriched first material component being evacuated as a sediment film through the opening in the base, washing fluid flowing transversely onto the sediment film and the washing fluid flowing through the sediment film and, in the process, an at least partial displacement of the remaining second material component taking place from the sediment film. The invention further relates to an appliance, in particular for carrying out the method.

7 Claims, 4 Drawing Sheets

METHOD OF AND APPLIANCE FOR MATERIAL SEPARATION

The invention relates to a method of material separation and an appliance for carrying out the method.

In a method of the generic type, a material, which comprises at least a first, heavy material component and a second, light material component is introduced into a sedimentation chamber of a container and subjected to a gravitational field. Under influence of the gravitational field in the sedimentation chamber, the first, heavy material component is enriched in a sedimentation zone, which is lower in gravitational direction and is bounded downward by a base. The material with the enriched first material component is evacuated downward from the sedimentation zone via an opening in the base. A washing fluid is introduced into the container in order to improve the separation between the first material component and the second material component.

An appliance of the generic type for material separation has a container, which comprises at least one sedimentation chamber for accepting and sedimenting a material, which is bounded at its lower end by a base. The latter has an opening for evacuating a sedimented material, a flow device for supplying a washing fluid being provided in the container.

A method of the generic type and an appliance of the generic type are, for example, revealed in DE 25 11 497 C3. A heavier mass flow is supplied from above to an exchange column and a lighter mass flow is supplied from below. Bases and passages in the exchange column are arranged in such a way that the heavy mass flow flows from above into the individual chambers and is set into a rotational motion. In this arrangement, the heavy mass flow acts as a driving jet which, by means of special passages in the base, draws off washing fluid from a chamber located further below in such a way that an intensive mixing takes place between the heavy mass flow and the washing fluid. This is intended to achieve the separation of at least a certain material component from the heavy mass flow, it being possible to deposit a heavy phase in a lower region of the exchange column and to evacuate it from there.

A precondition for carrying out this known method is that a desired stable flow behavior settles out within the exchange column. In practice, however, adjustment to such a stable flow behavior is very problematical and hardly achievable, because the individual initial materials are often subjected to major fluctuations with respect to their quantitative and qualitative composition. In the prior art of the generic type, furthermore, the desired intensive mixing acts against an efficient separation by sedimentation between a heavy phase and a light phase.

A further method of the generic type and an appliance of the generic type are revealed in DE 28 19 459 A1. In this known counterflow decanting method, a material mixture which has to be separated is introduced into a column-shaped appliance with a plurality of cells, while a washing fluid is introduced in counterflow to it. Each of the individual cells has a base with an opening which can be opened and closed by a valve. A certain solid material quantity from the material mixture settles on the base as a sediment, the valve being opened on attainment of a certain sediment quantity and the sediment being passed on in this way to the next cell. This involves a discontinuous method, the principle of the concentration or of the separation of the liquid from the solid being likewise based on mixing and dilution.

A method of separating insoluble particles from a liquid is, furthermore, known from WO 96/29134 A1, air bubbles being specifically mixed into a suspension. These air bubbles adhere to the insoluble particles so that a rising flotation layer, which can be simply removed, forms in a container.

A separating appliance with separating bodies irregularly arranged within it for separating media of different densities is revealed in DE 31 21 117 A1. The medium to be separated is introduced via a feed system to a lower surface of a settling container, the separating process taking place in the absence of a washing fluid.

A method of and an appliance for the clarification of liquids containing opaque material is described in DE 19 31 777 A1. In order to reduce the base surface of the clarification container, the latter is subdivided into steps. In this arrangement, the sedimented solid is separately removed from each settling unit. No provision is made for a use of washing fluid.

The invention is based on the object of creating a method and an appliance by means of which a simple, and at the same time particularly efficient, separation of two different material components is made possible.

According to the invention, the object is achieved by an appliance with the features of claim 1, on the other.

The method according to the invention is characterized in that the material with the enriched first material component is continuously evacuated as a sediment film through the opening in the base, washing fluid flowing transversely onto the sediment film, and in that the washing fluid flows through the sediment film and, in the process, an at least partial displacement of the remaining second material component takes place from the sediment film.

A basic idea of the invention consists principally in utilizing a displacement effect for material separation between the two material components, with no or practically no intensive mixing occurring in this displacement effect. The washing fluid, which can be a gas or a liquid, flows transversely onto and thus through the relatively thin sediment film which is enriched with the heavier material component. Because, in particular, of the different mass inertias of the various material components, the lighter material component is more strongly displaced from the sediment film by the washing fluid. As compared with the generic type method—mixing the material with a washing fluid and subsequent sedimentation—a clearly improved material separation is achieved by the method according to the invention. Relatively large mixing chambers are unnecessary in the process, so that the method according to the invention can be carried out in compact appliances.

The formation of a continuous, quasi steadystate sediment film is of essential importance. This sediment film should be understood as a permeable wall or curtain-type barrier, whose geometric configuration is mainly determined by the material components, the washing fluid and their flow properties. On the one hand, the sediment film should be sufficiently long and thin so that a reliable and sufficient flow of the washing fluid through the film is ensured. This makes a good displacement certain. On the other hand, the sediment film should be sufficiently thick and short so that it remains stable, while flow occurs within it, and does not partially separate.

According to a preferred development of the invention, provision is made such that, after the washing fluid has flowed through it, the material with the enriched first material component is introduced into at least one further sedimentation chamber in which the process of enriching the first material component, the formation of a sediment film and the flow of the washing fluid onto the sediment film are repeated. A subsequent repetition of the sedimentation process makes it also possible to recover the proportions of the first material component which have been displaced from the sediment film by the washing fluid. In addition, a separation of the washing fluid which has mixed with the material to be treated in the sediment film can also take place in the subsequent sedimentation stage.

For a particularly good material separation, the invention provides for the process of enriching the first material component and for the flow onto the sediment film to be repeated in a plurality of steps until a specified residual proportion of the second material component is attained. With a repetition of the method according to the invention in up to ten and more stages, a residual proportion of the second material component within the first material component can be reduced to practically any arbitrary value. The method according to the invention is particularly suitable for suspensions in which one material component is the solid and the other material component is a liquid. As a rule, the solid material is then the heavier material component, which sinks downward in the gravitational direction for sediment formation. In certain cases, for example in a method for sea-water desalination with the formation of ice crystals, the solid material forming the sediment can also be the lighter material component. The sediment formation then takes place against the gravitational direction. In addition to different physical states for the two material components, these can also, however, exhibit the same physical state, so that a separation between two fluids is possible. In what follows, the concept "above" is to be understood as being upstream in the sedimentation direction and the concept "below" as downstream in the sedimentation direction.

In order to carry out the method advantageously, it is expedient to use a fluid with a specific weight which differs from that of the first material component as the washing fluid. If the sediment formation takes place in the gravitational direction, the density of the washing fluid is less than that of the first material component. If the sediment formation takes place against the gravitational direction, the density of the washing fluid is expediently larger. In this arrangement, the washing fluid can also, in particular, be a solvent by means of which undesirable constituents are dissolved from the material to be treated and therefore separated as a second material component or additional to the second material component. The washing fluid can be the same as or different from the second material component, miscible or immiscible.

In the case of sedimentation chambers arranged in cascade one above the other, a particularly economic use of the washing fluid is achieved if the material to be separated is introduced into the container at an upper sedimentation chamber and the washing fluid is introduced into the container at a lower sedimentation chamber and if, after flowing through the sediment film at the lower sedimentation chamber, the washing fluid subsequently flows against the sedimentation direction to the sediment film of the sedimentation chamber above. This achieves counterflow washing against the sedimentation direction.

According to the invention, it is advantageous for a uniform procedure of the method for the material with the enriched first material component to be evacuated at one end of the container and the washing fluid to be evacuated with the second material component at an opposite end of the container.

In order to achieve a reliable transverse flow of the washing fluid through the sediment film, which flows essentially parallel to the gravitational direction, provision is made according to a further aspect of the invention for the material enriched with the first material component to flow through an annular opening in the base of the sedimentation chamber and, in the process, to form an annular closed sediment film, and For the washing fluid to flow through the annular closed sediment film from the outside to the inside or from the inside to the outside. In this arrangement, a corresponding flow duct for the washing fluid is, on the one hand, arranged radially outside the annular sediment film while, on the other hand, a further fluid duct for the washing fluid extends radially within the sediment film. In this way, the washing fluid can, on the one hand, flow radially inward through the washing film and be led upward to the next sedimentation chamber via the guide duct located radially inside. In the case of the upper chamber located above, on the other hand, the washing fluid can then flow from the inside radially outward through the annular sediment film in order to effect a renewed displacement procedure.

According to the invention, action is taken against undesirable deposits within the container and a blockage of the openings in the bases of the sedimentation chambers by kinetic energy being specifically introduced by means of a motive element in the container, in particular in the region of the sedimentation zone. This can, for example, take place by means of a stirrer, within the container or vibration generated within and/or outside the container. In the treatment of suspensions, in which sedimentation cakes form within the sedimentation chambers above the openings in the bases, shear forces are effected in the sedimentation cakes by a specific introduction of kinetic energy. By means of these shear forces, possible occurring and undesirable flow ducts for the washing fluid through the sedimentation cakes are constantly closed up. The kinetic energy is then adjusted in such a way that, by this means, the sedimentation process is not essentially impaired by additional mixing effects.

With respect to the appliance, the invention is characterized in that the opening in the base of the sedimentation chamber is configured as a gap by means of which a continuous sediment film can be generated during the evacuation of the sedimented material, and in that the flow device comprises at least one duct which is arranged in a region of the outlet of the sediment film from the gap and is configured for the approach flow of the washing fluid transverse to the sediment film. The method described previously can, in particular, be carried out with the appliance according to the invention. The flow onto and through the film takes place at an acute angle or, preferably, approximately at right angles to the sediment film.

A preferred embodiment of the appliance according to the invention consists in the gap in the base of the sedimentation chamber having an annular configuration in order to form an annular sediment film. In the case of a closed annular sediment film, which can have a circular shape or even one deviating from it, for example an angular shape, a reliable flow of the washing fluid through the sediment film is ensured.

According to the invention, this is achieved by, in particular, an inner duct being arranged as feed duct within the annular sediment film and by the flow device having an annular outer duct as evacuation duct, which surrounds the annular sediment film and is configured for evacuating the washing fluid which flows through the sediment film.

As an alternative to this or in combination with the embodiment mentioned above, it is also possible, according to the invention, for an outer duct to be configured as an annular feed duct and to surround the annular sediment film, and for an inner duct to be arranged as evacuation duct within the annular sediment film and to be configured for evacuating the washing fluid which flows through the sediment film. The evacuation duct for the washing fluid usually guides the latter upward against the gravitational direction, in particular to a further sedimentation chamber located above.

For a particularly compact appliance, by means of which a particularly good material separation between the two components can be achieved, provision is made according to the invention for a plurality of sedimentation chambers to be arranged in cascade one above the other in a container. The degree of the attainable material separation and, therefore, the degree of purity achieved for one material component also increases with the number of sedimentation chambers in the container.

In this cascade-type arrangement of a plurality of sedimentation chambers, it is preferred, according to the invention, for the evacuation duct of a sedimentation chamber to have a conduit connection to the feed duct of a sedimentation chamber located above and for the gap of a sedimentation chamber to be arranged immediately above the sedimentation chamber located underneath.

A continuous and, as far as possible, uniform sediment film is generated, according to the invention, by the base of the sedimentation chamber being configured as a funnel shape toward the gap. Action is also taken against the formation of solid deposits on the base of the sedimentation chamber by the oblique setting of the base relative to the gravitational direction.

In order to simplify the manufacture of the appliance, provision is also made, according to the invention, for the sedimentation chamber to have a rotationally symmetrical configuration relative to a center line and for the sedimentation chamber to have at least two annular wall elements, of which at least one wall element is configured conically relative to the center line. The appliance according to the invention can therefore be constructed from individual tubular and annular segments, which can be introduced into a simple cylindrical container. In the case of a plurality of sedimentation chambers, these can each be constructed from the same elements, thus permitting economical manufacture of the individual elements.

A particularly preferred design embodiment of the appliance according to the invention consists in a stand being provided which is arranged parallel to and, in particular, coaxial with the center line, and in that one radially inwardly located wall element of the sedimentation chamber being fastened to the stand. In this way, a sedimentation chamber can be essentially constructed from only two annular elements, namely an internally located wall element and an externally located wall element. The internally located wall element is then fastened to the central stand, whereas the externally located wall element can be fastened to the inside of the container or to supports extending along the inside of the container.

A preferred embodiment of the invention consists, furthermore, in the stand being supported so that it can be moved relative to the container. In this way, kinetic energy and, in particular, certain shear forces can be introduced into the sedimentation cakes via the stand or the container. This supports the uniform formation of the sediment film. In addition, ducts in the sedimentation cake possibly occurring through or by-passing the sedimentation cake are closed up again by the shear forces applied.

A particularly expedient design embodiment of the invention is achieved by the stand being rotatably supported and being rotationally driven by a motor.

According to the invention, furthermore, it is also possible for the stand to be displaced axially. The size of the gap in the base can be changed by an axial displacement of the stand and by fixing it in certain axial positions. By this means, the gap size can be adapted in a simple manner when there is a change to the material to be treated.

According to another embodiment of the invention, provision is made for the stand to be hollow and to be configured with penetrations for guiding the washing fluid within the stand. In this way, it is possible to ensure a simple fluid guidance system if, after flowing radially into an annular sediment film, the washing fluid has to be guided centrally relative to the next sedimentation chamber.

A uniform through-flow behavior, and therefore a continuous progress of the method, is ensured according to the invention by the container having an essentially cylindrical configuration relative to a center line.

According to the invention, a satisfactory withdrawal of the sedimented material component from the container is achieved by a base region of the container having a conical configuration and being provided with a central drain and an annular feed for the washing fluid. The base region of the container can also be expediently embodied as a hyperconcentrator, which is fundamentally known and is, for example, described in the journal "Filtrieren und Separieren" [filtration and separation] 1998, Volume 12, No. 1, pp. 8 to 15.

The invention is further developed by a settling zone being provided for collecting the washing fluid and the separated second material component at an end of the container opposite to the base region and by an inlet, for as yet untreated material, opening into the sedimentation chamber or chambers below the settling zone in the container.

A particularly satisfactory material separation can be achieved, according to the invention, by a plurality of containers being connected in parallel and/or in series. In the case of a series connection, the drain from one container would be connected to the feed of at least one further container so that, in order to achieve a desired degree of purity, a further material separation can be carried out. In the case of the parallel connection, the corresponding feeds and drains are connected together so that the through-flow capacity is increased.

The invention is further explained below using preferred embodiment examples which are represented diagrammatically in the drawings. In these:

Figure 1:
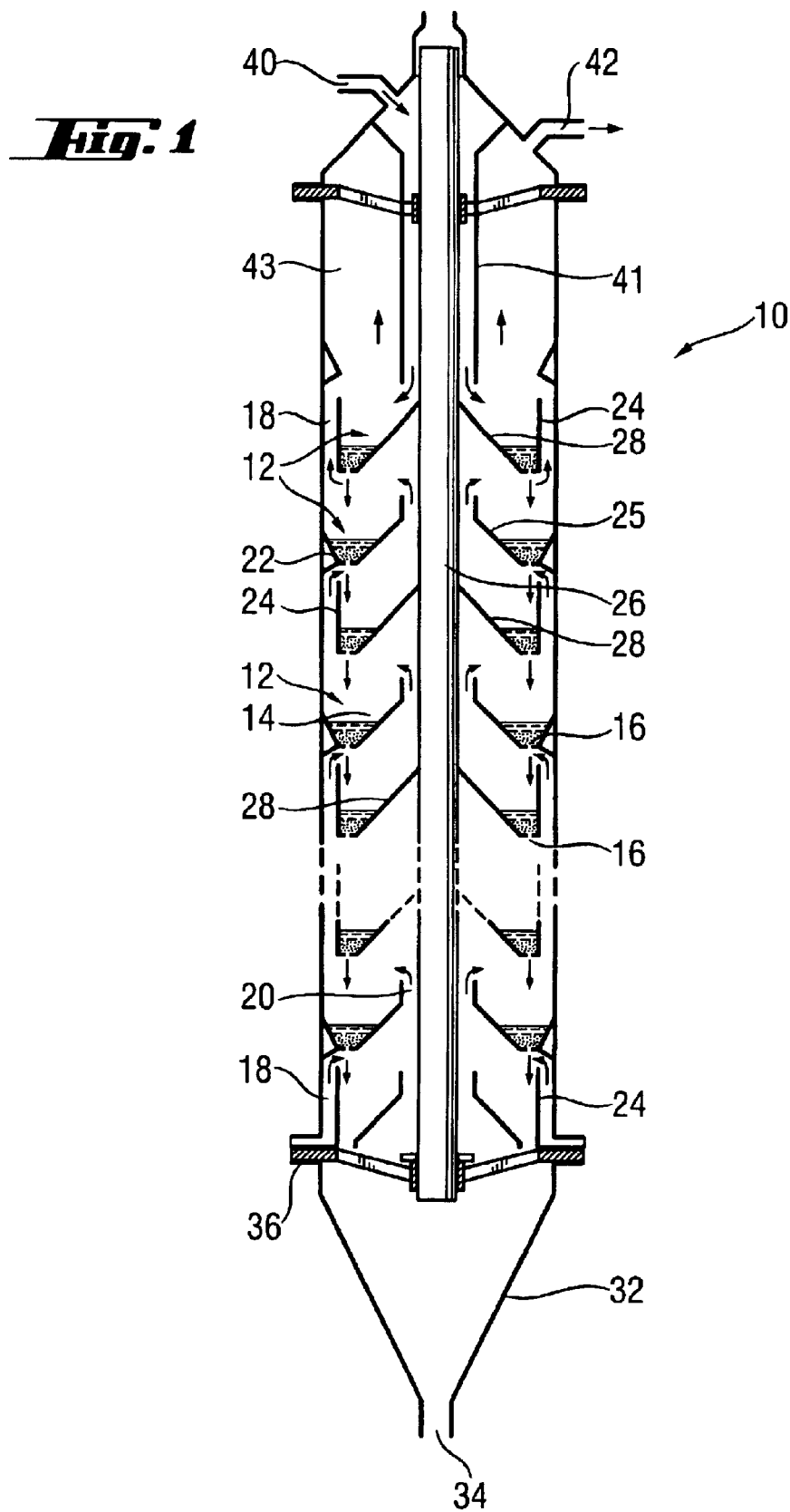
FIG. 1 shows a diagrammatic representation of an appliance according to the invention, in a first embodiment.

FIG. 1 shows the diagrammatic representation of a first embodiment of the present invention. In the embodiment shown, the sedimentation direction is in the same direction as the gravitational direction so that the heavier sediment settles downward. When materials are being treated in which the material component forming the sediment is lighter than the washing fluid, the sedimentation direction extends opposite to the gravitational direction. In this case, the appliance shown can be employed by inverting it by 180°.

An elongated container 10 contains a plurality of sedimentation chambers 12. The container 10 can have various lengths. In the present diagrammatic representation, the container 10 is incompletely represented, as is indicated by the dashed lines. The individual sedimentation chambers 12 have bases 14 and are bounded or subdivided by annular wall elements 22, 24, 25, 28. If a material to be separated, with a first and a second material component, is now introduced through an opening 40 into the container 10 then, after passing through a central inlet tube 41, it first enters the uppermost sedimentation chamber 12 and sediments under the influence of a gravitational field. In this process, a heavy phase with the one material component, which forms a sediment, appears and a light phase, which consists of a washing fluid and the other material component, appears and flows upward. The sediment collects in the funnel-shaped sedimentation chamber 12 and flows through an annular opening 16, configured as a gap, in the base 14. The respective sedimentation chamber 12 is formed and laterally bounded by annular wall elements 24, 28 and 22, 25. The gap-shaped opening 16 causes the formation of a relatively thin sediment film, which spreads in the direction of the gravitational force. The sediment film subsequently flows into the next sedimentation chamber 12 so that the process of forming a sediment film can be repeated sequentially.

An annular feed 36 for a washing fluid is provided at the bottom of the container 10. The washing fluid is guided from the bottom upward through the container 10 so that a counterflow is formed relative to the material to be separated. A suitable flow device achieves the effect that the washing fluid flows transversely onto the sediment film evacuated at the base 14 through the openings 16, so that flow occurs through the sediment film and, in the process, a displacement of the second material component from the sediment film takes place at least partially. The flow behavior is illustrated by arrows.

A stand 26 is supported centrally in the container 10 so that it can be displaced axially and rotated, which stand can be driven from above by a motor (not represented). Radially inwardly located wall elements 25, 28 are attached to the stand. These wall elements 25, 28, together with further wall elements 22, 24 arranged on the container 10, influence the flow behavior of the substances guided through the container 10. In particular, a radially outwardly located cylindrical wall element 24 forms, together with the container 10, an outer duct 18 for the washing fluid, while an inner duct 20 of the adjacent sedimentation chambers 12 is formed by a radially inwardly located wall element 25 and the tubular stand 26. The column-type arrangement of sedimentation chambers 12 alternatively exhibit the outer duct 18 and the inner duct 20 so that a meander-shaped (in cross section) flow of the washing fluid is generated. In order to support delivery of the sediment to the openings 16 in the sedimentation chambers 12, the wall elements 22, 25, 28 have conically configured regions.

The washing fluid guided through an outer duct 18 flows radially inward from the outside and impinges transversely on a sediment film, which flows, essentially parallel to the center line, out of the annular opening 16 of a base 14. Flow essentially takes place through the sediment film so that at least one material component is at least partially displaced. The washing fluid subsequently flows essentially along the lower surface of the base 14 and through the inner duct 20 to the sedimentation chambers 12 located above. After emerging from the inner duct 20, a transverse flow again appears as a result of which flow now takes place from the inside radially outward through the annular sediment film of the sedimentation chamber 12 located above. After passing through the uppermost, outer duct 18, the washing fluid, together with the material component which has been washed out, flows into a settling zone 43 in which a final sedimentation procedure can take place. The washing fluid with the at least one enriched material component is evacuated via an outlet opening 42 from this settling zone 43.

The lower region 32 of the container 10 has a conical configuration. An opening 34 in the cone-type container section 32 is provided for removal of the material component which has entered the lower region.

Figure 2:
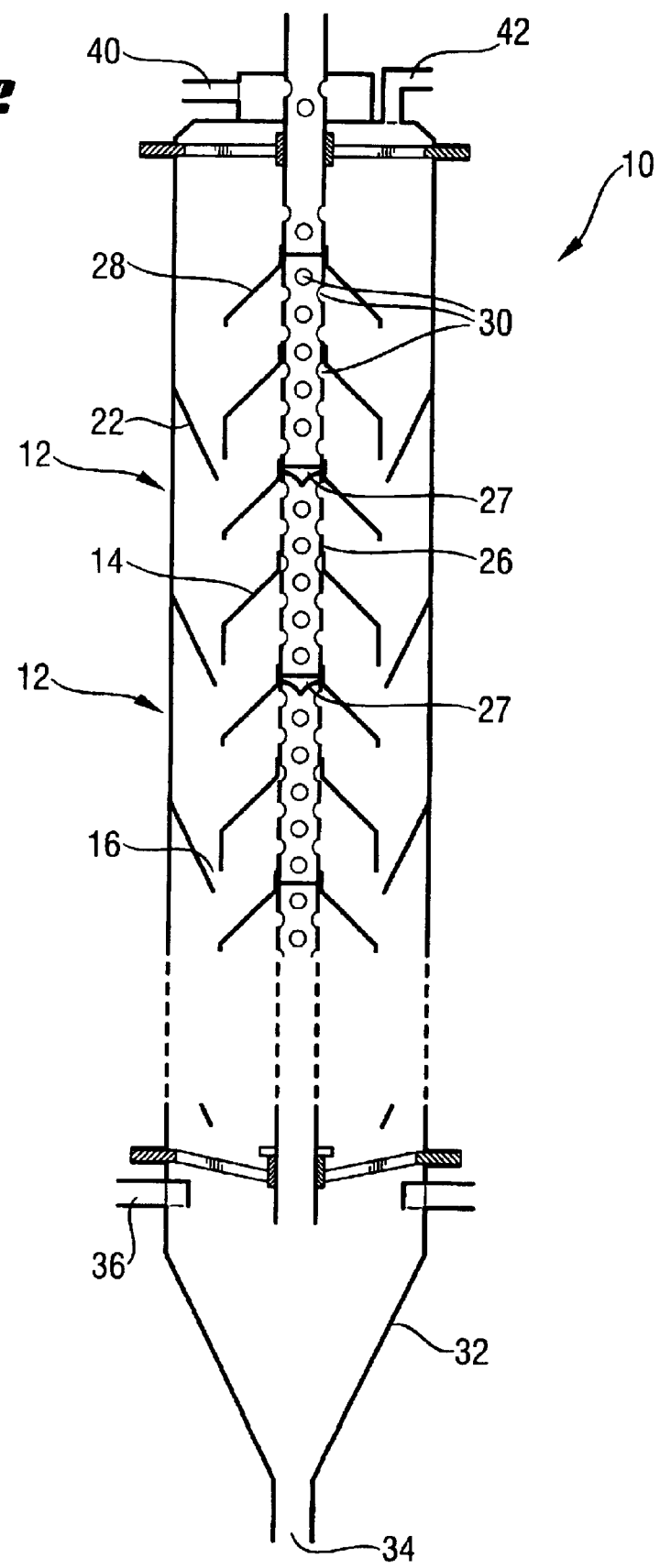
FIG. 2 shows a diagrammatic representation of an appliance according to the invention, in a second embodiment.

A further embodiment of the present invention is represented in FIG. 2. A special feature to be mentioned is that, after it has entered the opening 40, the material to be separated is transported through the hollow internal region of the stand 26, which is configured parallel to the center line of the container 10. So that the stand 26 can be used as an inner duct for guiding washing fluid, the stand 26 is provided with openings 30 and barriers 27, as flow barriers, so that the fluid can reach the sedimentation chambers 12 in a specific manner. There, once again, the displacement according to the invention of at least one material component takes place from a sediment film which is forming, the washing fluid being again responsible for the displacement. Here again, the sediment film forms at an opening 16, the latter being configured between the base 14 and a conically extending wall element 22.

Figure 3:
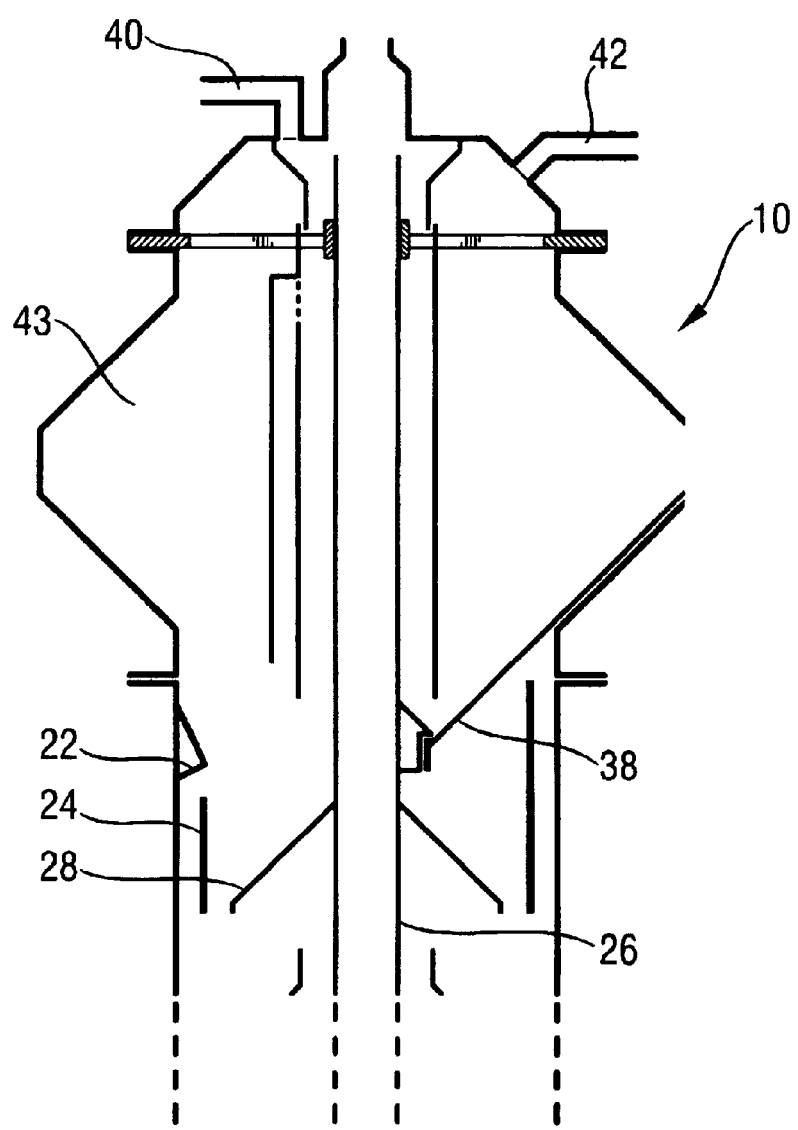
FIG. 3 shows a diagrammatic representation of an excerpt from an appliance according to the invention, in a third embodiment.

FIG. 3 shows a part of a further special embodiment of the present invention with the feed 40, for the material to be separated, and the drain 42 for the washing fluid. A special feature of this embodiment consists in the larger diameter of the settling zone 43, which improves a final sedimentation. Shear forces, which prevent the formation of solid deposits in the settling zone 43, are introduced by a stirrer 38. A delivery effect toward the center of the container is generated by means of the stirrer 38. The sequence of sedimentation chambers 12 can, for example, correspond to the embodiment examples in FIG. 1 or FIG. 2, other embodiments effecting the principle according to the invention being, however, conceivable.

Figure 4:
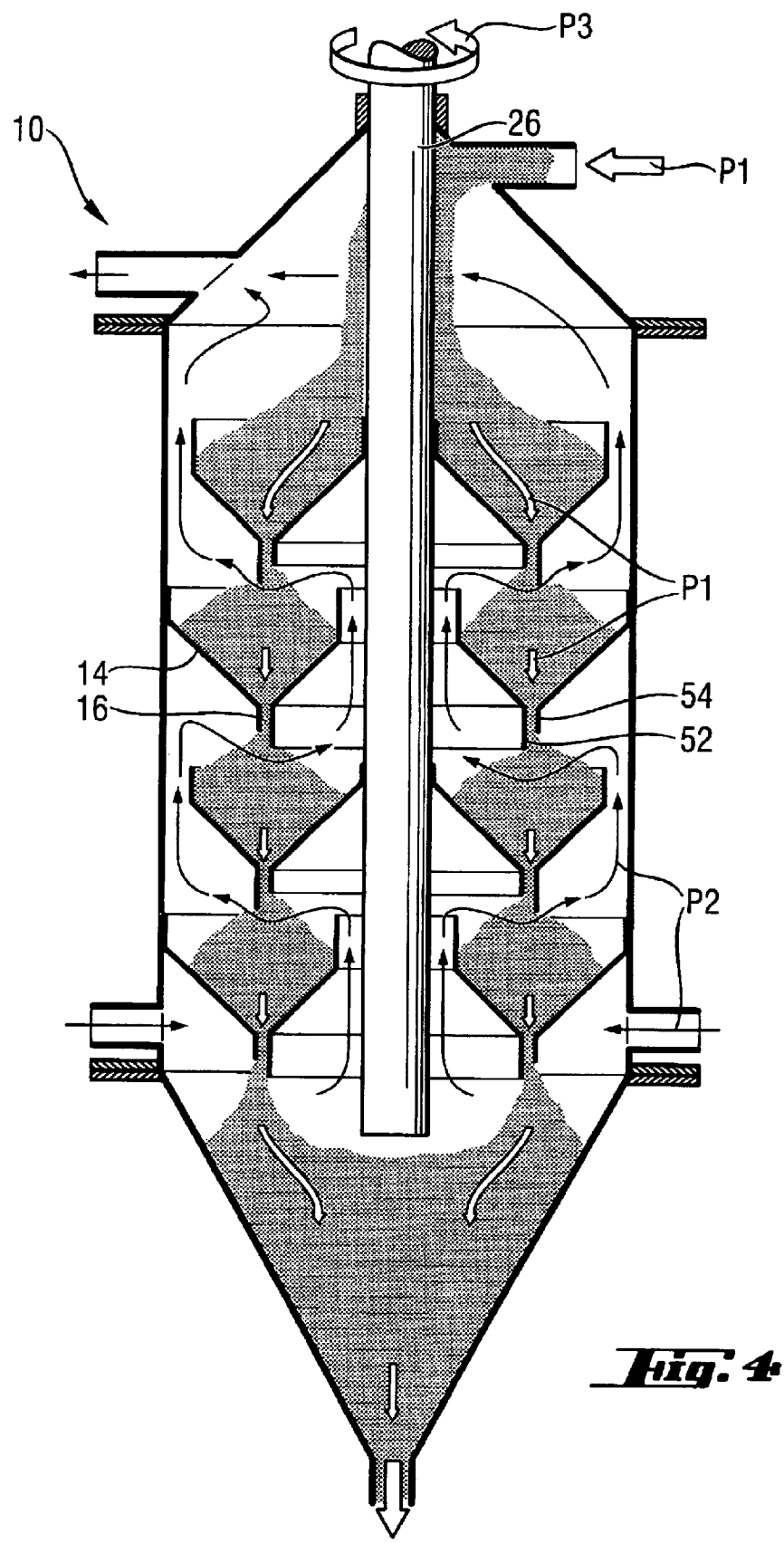
FIG. 4 shows a diagrammatic representation of an appliance according to the invention, in a fourth embodiment.

A fourth embodiment of an appliance according to the invention is shown in FIG. 4. Its fundamental construction and, therefore, mode of operation corresponding essentially to the embodiments previously described. Only individual design differences is therefore considered in what follows.

A material to be separated, which has a sediment-forming material component, is introduced at an upper end of a container 10. The course of the material component is illustrated by the white arrows P1 while the introduction and progress of the flow of a washing fluid guided in counterflow to this are designated by the arrows P2.

In order to form a particularly stable sediment film at a gap-shaped opening 16 on the base 14 of each individual sedimentation chamber, the gap-shaped opening is surrounded by two vertically extending, annular boundary walls 52, 54. In this arrangement, a first boundary form 52 is configured to be longer in the vertical direction than a second boundary wall 54. In the present embodiment, the first boundary wall 52 is arranged facing away in the flow direction of the washing fluid, as shown by arrow P2, thus preventing an undesirable separation of the sediment film immediately after the opening 16.

In the present embodiment, the feed of the material to be separated is controlled in such a way that on emergence of the sedimented first material component from a sedimentation chamber, the sediment film merges approximately cone-shaped in cross section into the sediment formed in the following sedimentation chamber. In the case of this sediment film which is spreading in cone-shape, it is also essential to ensure that a sufficient flow of washing fluid takes place through the relatively wide sediment film. This embodiment can, in particular, be employed in the generation of plastic, for example in the separation of PPS or PE from an associated solvent.

The individual bases 14 on both sides of the respective gap 16 are provided with a slope for a satisfactory material flow through the individual sedimentation chambers. In addition, a central stand 26 and the annular walls of the individual sedimentation chambers fastened to it is put into rotation, as shown by arrow P3. By means of this additional introduction of a certain kinetic energy, undesirable through-flow ducts within the sediment regions can be rapidly and reliably closed up.

What is claimed is:

1. An appliance for material separation having a container (10), which comprises at least one sedimentation chamber (12) for accepting and sedimenting a material, which is bounded at one end by a base (14) which has an opening (16) for evacuating a sedimented material, a flow device for supplying a washing liquid being provided in the container (10), characterized in that the opening (16) in the base (14) of the sedimentation chamber (12) is configured as a gap by means of which a continuous sediment film can be generated during the evacuation of the sedimented material, and the flow device comprises at least one duct (18, 20), which is arranged in a region of the outlet of the sediment film from the gap and is configured for the approach flow of the washing liquid through the sediment film, the gap in the base (14) of the sedimentation chamber (12) having an annular configuration in order to form ad annular sediment film, and wherein an inner duct (20) is arranged as feed duct within the annular sediment film and in that the flow device has an annular outer duct (18) as evacuation duct, which surrounds the annular sediment film and is configured for evacuating the washing liquid which flows through the sediment film.

2. An appliance for material separation having a container (10), which comprises at least one sedimentation chamber (12) for accepting and sedimenting a material, which is bounded at one end by a base (14) which has an opening (16) for evacuating a sedimented material, a flow device for supplying a washing liquid being provided in the container (10), characterized in that the opening (16) in the base (14) of the sedimentation chamber (12) is configured as a gap by means of which a continuous sediment film can be generated during the evacuation of the sedimented material, and the flow device comprises at least one duct (18, 20), which is arranged in a region of the outlet of the sediment film from the gap and is configured for the approach flow of the washing liquid through the sediment film, the gap in the base (14) of the sedimentation chamber (12) having an annular configuration in order to form an annular sediment film and wherein an outer duct (18) is configured as an annular feed duct which surrounds the annular sediment film, and in that an inner duct (20) is arranged as evacuation duct within the annular sediment film and is configured for evacuating the washing liquid which flows through the sediment film.

3. An appliance for material separation having a container (10), which comprises at least one sedimentation chamber (12) for accenting and sedimenting a material, which is bounded at one end by a base (14) which has an opening (16) for evacuating a sedimented material, a flow device for supplying a washing liquid being provided in the container (10), characterized in that the opening (16) in the base (14) of the sedimentation chamber (12) is configured as a gap by means of which a continuous sediment film can be generated during the evacuation of the sedimented material, and the flow device comprises at least one duct (18, 20), which is arranged in a region of the outlet of the sediment film from the gap and is configured for the approach flow of the washing liquid through the sediment film, and a plurality of sedimentation chambers (12) arranged in cascade one above another in the container (1), and wherein the evacuation duct of a sedimentation chamber (12) has a conduit connection to the feed duct of a sedimentation chamber (12) upstream in the sedimentation direction, and in that the gap (16) of a sedimentation chamber (12) is arranged immediately above the downstream sedimentation chamber (12) in the sedimentation direction.

4. An appliance for material separation having a container (10), which comprises at least one sedimentation chamber (12) for accepting and sedimenting a material, which is bounded at one end by a base (14) which has an opening (16) for evacuating a sedimented material, a flow device for supplying a washing liquid being provided in the container (10), characterized in that the opening (16) in the base (14) of the sedimentation chamber (12) is configured as a gap by means of which a continuous sediment film can be generated during the evacuation of the sedimented material, and the flow device comprises at least one duct (18, 20), which is arranged in a region of the outlet of the sediment film from the gap and is configured for the approach flow of the washing liquid through the sediment film, the sedimentation chamber (12) having a rotational symmetrical configuration relative to a center line, the sedimentation chamber (12) of at least two annular wall elements (22, 25; 24, 28), of which at least one wall element (22, 25; 24, 28) is configured conically relative to the center line, and wherein a stand (26) is provided which is arranged parallel to and, in particular, coaxial with the center line, and in that at least one radially inwardly located wall element (25; 28) of the sedimentation chamber (12) is fastened to the stand (26).

5. The appliance as claimed in claim 4, characterized in that the stand (26) is supported so that is can be moved relative to the container (10).

6. The appliance as claimed in claim 5, characterized in that the stand (26) is rotatably supported and is rotationally driven by a motor.

7. The appliance as claimed in claim 4, characterized in that the stand (26) can be displaced axially.

* * * * *

UNITED STATES PATENT AND TRADEMARK OFFICE
CERTIFICATE OF CORRECTION

PATENT NO. : 6,874,644 B1  
DATED : April 5, 2005  
INVENTOR(S) : Reinhard Wagener et al.

Page 1 of 1

It is certified that error appears in the above-identified patent and that said Letters Patent is hereby corrected as shown below:

<u>Column 9,</u>  
Line 31, delete "ad" and insert -- an --.

<u>Column 10,</u>  
Line 3, delete "accenting" and insert -- accepting --.

Signed and Sealed this

Eleventh Day of October, 2005

JON W. DUDAS  
*Director of the United States Patent and Trademark Office*